No. 762,996. PATENTED JUNE 21, 1904.
F. HAMILTON.
APPARATUS FOR FINDING THE AXIS AND PRISMATIC POWER OF LENSES.
APPLICATION FILED DEC. 26, 1903.
NO MODEL. 2 SHEETS—SHEET 1.
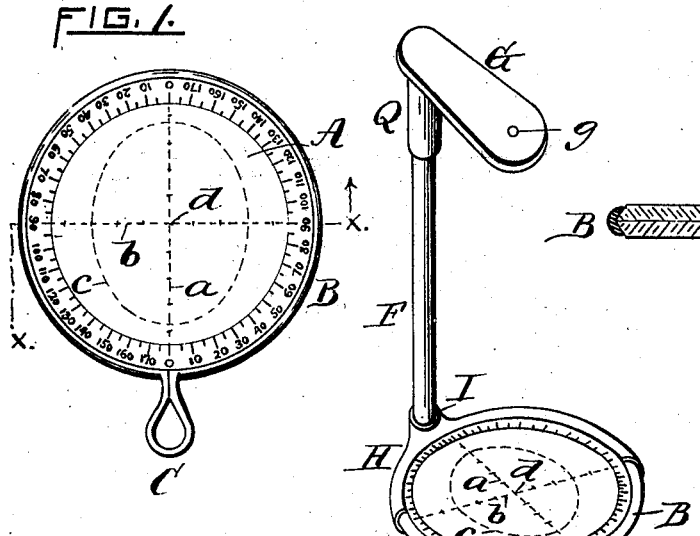
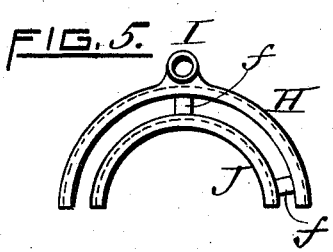
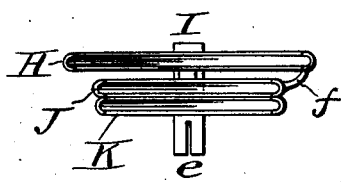
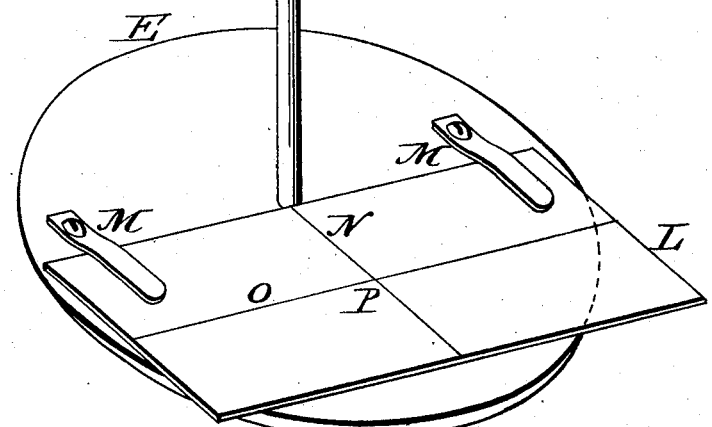
WITNESSES.  INVENTOR.
C. T. Hannigan  Fred Hamilton
Annie E. Pirce  By Warren R. Perce
  Attorney
THE NORRIS PETERS CO., PHOTO-LITHO., WASHINGTON, D. C.

No. 762,996. PATENTED JUNE 21, 1904.
F. HAMILTON.
APPARATUS FOR FINDING THE AXIS AND PRISMATIC POWER OF LENSES.
APPLICATION FILED DEC. 26, 1903.
NO MODEL. 2 SHEETS—SHEET 2.
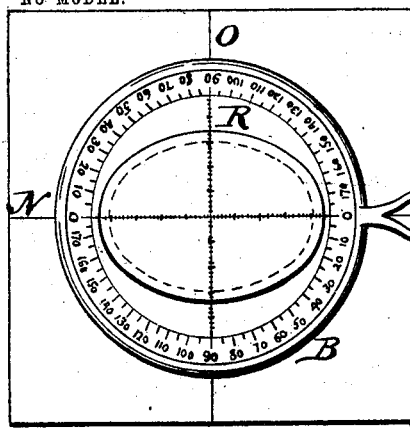
FIG. 7.
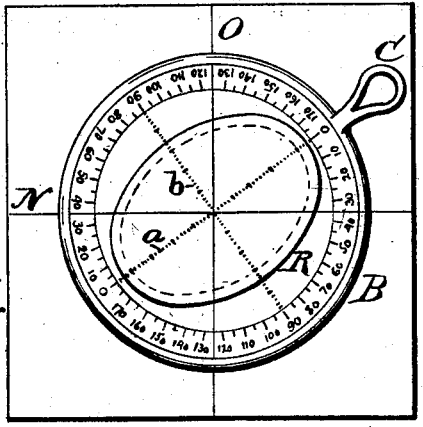
FIG. 9.
FIG. 8.
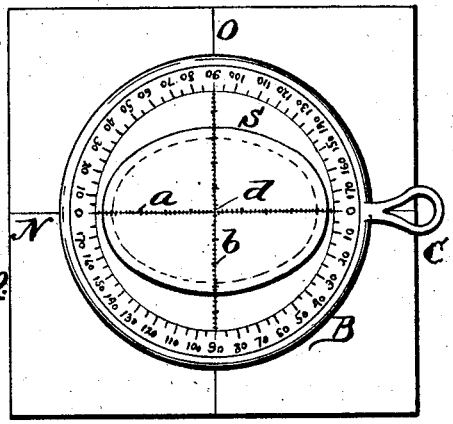
FIG. 10.
FIG. 11.
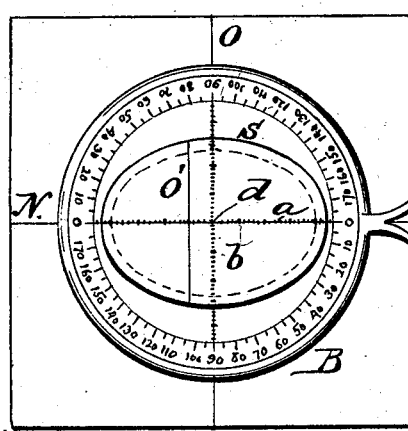
FIG. 12.
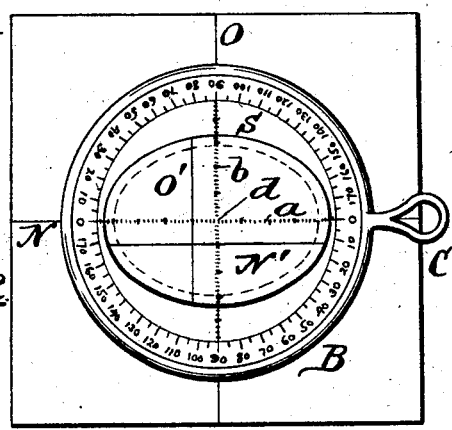
WITNESSES.
C. T. Hannigan.
Annie E. Pirce.
INVENTOR.
Fred Hamilton
By Warren R. Pirce
Attorney.
THE NORRIS PETERS CO., PHOTO-LITHO., WASHINGTON, D. C.

No. 762,996. Patented June 21, 1904.

UNITED STATES PATENT OFFICE.

FRED HAMILTON, OF PROVIDENCE, RHODE ISLAND.

APPARATUS FOR FINDING THE AXIS AND PRISMATIC POWER OF LENSES.

SPECIFICATION forming part of Letters Patent No. 762,996, dated June 21, 1904.

Application filed December 26, 1903. Serial No. 186,647. (No model.)

*To all whom it may concern:*

Be it known that I, FRED HAMILTON, a citizen of the United States, residing at Providence, in the county of Providence and State of Rhode Island, have invented certain new and useful Improvements in Apparatus for Finding the Axis and Prismatic Power of Lenses, of which the following is a specification, reference being had therein to the accompanying drawings.

Like letters indicate like parts.

Figure 1 is a plan view of my improved apparatus for finding the axis and prismatic power of lenses. Fig. 2 is a diametrical section of the same on line *x x* of Fig. 1. Fig. 3 is a modified form of said apparatus as seen in section on said diametrical line. Fig. 4 is a perspective view of a stand used in connection with said apparatus to support the same and lenses to be examined or tested. Fig. 5 is a top plan view of the holders for said apparatus and lenses. Fig. 6 is a front elevation of the same. Figs. 7, 8, 9, 10, 11, and 12 are plan views illustrating the uses of said apparatus in examining and testing lenses, as will be hereinafter particularly explained.

My invention relates to an instrument of precision for the use of opticians in the manufacture and selection of lenses for the purpose of determining or ascertaining the axis and also the prismatic power of said lenses; and it consists of the novel construction and combination of the several parts, as hereinafter described, and specifically set forth in the claims.

In the drawings, A A represent two circular disks, of glass, celluloid, or other suitable transparent material. Each disk A is plane and its two opposite surfaces are parallel to each other. It has its edge beveled, preferably at an angle of forty-five degrees, as shown in Fig. 2. These disks A A are placed together, so that their beveled edges form an outwardly-directed V shape, and they are inclosed in a rim or ring B, made of metal or any suitable material, and provided with a V-shaped channel or groove on the inner side thereof to receive the V-shaped edge of the two disks A A when the latter are in juxtaposition, all as fully illustrated in Fig. 2. The rim B has a handle C, as shown in Figs. 1 and 4.

On the inner surface of one of the disks A a scale of circular measurements is etched, printed, or otherwise indicated, and the angles are marked in two series from "0" to "180," thus making a complete circle. The reason for using two disks A A is to protect these marks and angles from wear or defacement, as they are on the inner surface of one of said disks. The instrument as thus far described is a protractor for measuring angular spaces or lines, and as these marks and lines are on the glass or other transparent substance it is possible to see between them any line on an object card or lens which is held in proper relative position thereto. I may, however, use a circular piece of paper or other proper material, which may be opaque or transparent and upon which the lines and marks indicating angles are printed or otherwise displayed, and such circular piece (designated as D in Fig. 3) can be inserted between the inner contiguous surfaces of the disks A A and held therein by the pressure of said disks in the rim B.

On the inner surface of one of the disks A are etched, printed, or otherwise marked two dotted lines *a* and *b*, intersecting each other at right angles at the geometrical center of the disk A, and these dotted lines constitute a graduated scale to show spaces one millimeter in extent, each fifth line being properly designated by the approximate number. These millimeter-scales measure the degree of the prismatic power of the lens.

A line *c* of short dashes is etched, printed, or otherwise marked on the inner surface of one of the disks A in the elliptical form in which the lenses of spectacles or eyeglasses are made. This elliptical line of dashes may be called the "lens pattern-line," and the major diameter of the ellipse, though not shown, is coincident with the line *a* of the disk A, and the minor diameter of said ellipse, though not shown, is coincident with the line *b* of the disk A. The point of intersection of the lines *a* and *b* is marked *d* in Fig. 1 and indicates the geometric center of the disk A and also the geometric center of the ellipse of dotted lines c.

This combined protractor and prism-indicator may be used by hand if the optician is skilled in such manipulations, but can more accurately and with greater precision be used in connection with a suitable stand or support, which is illustrated in Fig. 4. This stand consists of a base E, a vertical rod F, fastened to said base, preferably at the center thereof, an eyepiece G, mounted on the top of the rod F, and a holder H. The holder H is mounted on a tube I and the tube I is mounted on the rod F. The tube I is slitted, as shown at e in Fig. 6, to hold the tube I frictionally by spring-pressure upon the rod F. The holder H is curved and extends about one hundred and eighty degrees, or ninety degrees on each side of the tube I. The holder H is half-round in cross-section and of such size as to receive and hold the rim B of the protractor, as shown in Fig. 4.

Beneath the holder H and concentric therewith, but of smaller diameter, are two semi-circular lens-holders J K, each of which is half-round in cross-section. The lens-holders J K are soldered or otherwise fastened together, as shown in Fig. 6, and the lens-holder J is supported by three radial brackets f from the holder H.

The eyepiece G has a sight-aperture g, as appears in Fig. 4.

On the top of the base E an object-card L is placed and held in position by the spring-clips M or by other suitable means. This object-card L has two solid black lines N O intersecting each other in the middle at right angles. The point of the intersection of these lines N O is marked P in Fig. 4.

As illustrated in Fig. 4, the instrument A B should be so placed in the holder H and the object-card L should be so placed on the base E of the stand that the sight-aperture g of the eyepiece G, the point d of the disk A, and the point P of the object-card L are all in line with each other.

Having thus explained and described the construction and combination of the several parts of this device, I will now state the manner in which it is used for the several purposes for which it is adapted.

First, I will explain how to use it as an axis-finder to ascertain the axis of a cylindrical lens. The lens to be tested is designated as R. This lens R is first placed upon the disk A, as illustrated in Fig. 7, in such position that its edge will be parallel to the lens-pattern or elliptical series of dash-lines c. That side of the lens R must be uppermost which is to go next to the eye. The operator will then hold the lens R and the disk A firmly together, so that they do not rotate or otherwise move one on the other, and then he will look through the sight-aperture g and notice the lines N O on the object-card L. If said lines N O instead of appearing (as they really are) straight appear to be broken, as shown in Fig. 8 at N' O', then the operator will rotate the disk A and the lens R together by the handle C, moving said handle C from the position shown in Fig. 8 to the proper position—say that shown in Fig. 9—being, however, careful not to displace the lens R upon the disk A. This proper position to which the disk A and lens R must be rotated by the handle C is that position in which the lines N O of the card L will appear through the disk A and lens R as perfectly straight and unbroken, as illustrated in Fig. 9. The line O is now seen to cross the protractor at one hundred and twenty-five degrees and the line N at thirty-five degrees. This line O represents one axis of the lens R. The other will of course be ninety degrees distant therefrom. Thus if the axis recorded be less than ninety degrees the other may be determined by adding ninety degrees to it. Example: If one axis is ten degrees, add ninety degrees. The other axis is one hundred degrees. If the axis indicated on the protractor is more than ninety degrees, subtract ninety degrees. Example: If one axis is one hundred and twenty-five degrees, subtract ninety degrees. The other axis is thirty-five degrees.

Second. In order to use this apparatus to find the prismatic power of a lens or the base of any prism, simple or compound, the operator will proceed as follows: He will place the prism-finder or disk A in the holder H in such position that the dotted lines a b of the disk A will appear exactly over the solid lines N O of the object-card L when he looks through the sight-aperture g of the eyepiece G. He then will place the lens S, whose prismatic power he desires to test, on the disk A in such position that the edges of the lens S are parallel to the elliptical lens-pattern c on the disk A, as illustrated in Fig. 10. In this figure it is seen that the line a coincides with the line N and that the line b coincides with the line O and that the point d on the disk A coincides with the point P of the intersection of the lines N O of the object-card L. If the lens S has spherical or cylindrical power, the operator must first neutralize such power by selecting proper lenses from his trial-case for that purpose, and these neutralizing-lenses he will place in the holders J K. When the spherical or cylindrical power of the lens has been thus neutralized, he will look through the sight-aperture g and see how the line a of the disk A appears in relation to the line N of the object-card L and how the line b of the disk A appears in relation to the line O of the object-card. If the line a coincides with the line N and the line b coincides with the line O, as in Fig. 10, there is no prism-power; but if the solid line O of the card L appears removed to one side of the dotted line b on the disk A, as illustrated at O' in Fig. 11, it indicates a five-degree prism, base out, (the base always being in an opposite direction from the solid line.) If the solid lines N O are both displaced by the lens S, as at N' O', (illustrated in Fig. 12,) it indicates a five-degree prism, base out, and a five-degree prism, base up.

Third. This apparatus is also useful for decentering lenses and by its use considerable time and expense can be saved in obtaining the prismatic equivalents of lenses. In order to ascertain whether or not it is possible to decenter an uncut lens to combine a certain prism with it, the operator will lay the lens upon the disk A and place said lens in such a position thereon as will allow the lines N O of the card L to coincide with the lines $a\,b$ of the disk A. He will then make in india-ink a central dot upon said lens directly over the point $d$ of the disk A and the point P of the object-card L, (which two points will exactly coincide when the lines N O $a\,b$ coincide, as aforesaid.) Next the operator will place in the holder J beneath the disk A such a lens as will neutralize the lens which he is about to grind and which is on top of the disk A, or, if necessary, will also place in the holder K another lens, which with the lens in the holder J will neutralize the lens which is on top of the disk A. He will then move the lens which is on the top of the disk A in such a manner that the line (N or O, as the case may be) which is on the object-card L will, as seen through said lens as observed through the sight-aperture $g$, seem to move in the opposite direction from the position where he desires to locate the base of the prism, and he will stop moving the lens on the top of the disk A precisely when such solid line of the object-card L appears to cross the dot or mark, which indicates the degree of prismatic power required. Then he must again dot with india-ink the lens over the central point $d$. In setting the lens to be ground on the lens-cutting machine the center of the lens as ground must coincide with the last-made ink-dot upon the lens.

Fourth. By means of this instrument it can be easily determined how large a lens can be made from an uncut lens. If, for example, a lens is decentered for a two-degree prism and it is found that the side of the lens nearest the center dot $d$ on the disk A crosses the fifteen-degree mark, that would indicate that the lens to be made cannot exceed thirty millimeters in diameter. The prism-scale on the lines $a\,b$ of the disk A is provided with degree-marks one millimeter apart. This affords a very convenient means for ascertaining the diameter of a lens in millimeters. If the operator prefers to use this prism-finder without the stand, he should hold the same sixteen and one-half centimeters from the object-card L and twenty-four centimeters from the eye.

By means of this device the axis of any lens can be positively determined and the exact power and direction of the base of the prism can be ascertained. It shows the amount of decentering necessary to obtain any prismatic combination desired—namely, if a single prism is required base in, out, up, or down, or double-prism combinations with base in and down, in and up, out and down, or out and up. It will also show what is the largest-sized lens which can possibly be cut from an uncut lens after the lens has been decentered as required. It enables the exact measurement in millimeters of any lens. It prevents the necessity of cementing a broken lens together in order to find what its axis is. It can be used as quickly and accurately on mounted lenses as on loose lenses and avoids the necessity of dotting the lens in order to find its axis, as has hitherto been done. It is simple, durable, cheap, and portable, and it not only performs the work desired with accuracy, but it saves time.

This instrument is very efficient and convenient for use in direct face measurement for optical purposes. The operator by holding it in front of the patient's eye, so that the point $d$ of the dotted cross-lines $a\,b$ of the disk A is directly in front of the center of the pupil of the eye of the patient, can readily ascertain the length in millimeters of the diameter of the lens which is proper to fit the features, as in this manner the distance from the eyebrow to the cheek and from the eye to the nose and other similar measurements can be quickly obtained.

Instead of having the instrument detachable from the stand, as shown in Fig. 4 and as hereinbefore described, it may be secured permanently to the rod F directly.

I claim as a novel and useful invention and desire to secure by Letters Patent—

1. The improved device herein described for determining the axis of a cylindrical lens, consisting of two transparent disks with a graduated scale upon the inner side of one of said disks for circular measurements, and a rim inclosing the edges of said disks and adapted to hold said disks together, substantially as specified.

2. The improved device herein described for determining the axis of a cylindrical lens, consisting of two transparent disks with a graduated scale between them for circular measurements, and a rim inclosing the edges of said disks and adapted to hold said disks together, substantially as specified.

3. The improved device herein described for determining the prismatic power of a lens, consisting of a transparent disk having two lines crossing each other centrally at right angles and divided into equal spaces constituting said lines as scales for measuring degrees of prismatic power, substantially as specified.

4. The improved device herein described for determining the prismatic power of a lens, consisting of two transparent disks having two lines crossing each other centrally at right angles marked on the inner surface of one of said disks and provided with equidistant scale-marks for measuring degrees of prismatic power, substantially as specified.

5. The improved device herein described for determining the prismatic power of a lens, consisting of a transparent disk having a diametrical line divided into equidistant scale-marks adapted to measure degrees of prismatic power, substantially as specified.

6. The improved device herein described, consisting of two beveled-edged transparent disks, having between them a graduated scale of three hundred and sixty degrees of circular measurement, and two lines crossing each other centrally at right angles and divided by equidistant marks adapted to measure degrees of prismatic power, a rim having a V-shaped groove adapted to hold said disks, and a handle projecting from the rim on one side thereof, substantially as specified.

7. The improved device herein described, consisting of two beveled-edged transparent disks, having between them a graduated scale of three hundred and sixty degrees of circular measurement, and two lines crossing each other centrally at right angles and divided by equidistant marks adapted to measure degrees of prismatic power, and also a concentric lens-pattern in dotted lines, a rim having a V-shaped groove adapted to hold said disks, and a handle projecting from said rim at one side thereof, substantially as specified.

8. The improved lens-holder herein described consisting of a semicircular bracket having a groove in its inner edge, a sleeve on which said holder is mounted, a second semicircular bracket concentric with the first-named bracket but beneath the same and of smaller diameter and provided with a groove in its inner edge, radial arms connecting two brackets at intervals, and a third semicircular bracket of the same size and shape as said second-named bracket fastened to said second-named bracket beneath the same and provided with a groove on its inner edge, substantially as described.

In testimony whereof I affix my signature in presence of two witnesses.

FRED HAMILTON.

Witnesses:
WARREN R. PERCE,
HOWARD A. LAMPREY.